(12) United States Patent
Keller-Staub

(10) Patent No.: US 8,136,793 B2
(45) Date of Patent: Mar. 20, 2012

(54) VALVE ARRANGEMENT

(75) Inventor: Pierino Keller-Staub, Trübbach (CH)

(73) Assignee: Inficon GmbH, Bad Ragaz (CH)

( * ) Notice: Subject to any disclaimer, the term of this patent is extended or adjusted under 35 U.S.C. 154(b) by 365 days.

(21) Appl. No.: 12/625,362

(22) Filed: Nov. 24, 2009

(65) Prior Publication Data

US 2010/0148107 A1 Jun. 17, 2010

(30) Foreign Application Priority Data

Dec. 12, 2008 (CH) ..................... 01954/08

(51) Int. Cl.
*F16K 1/22* (2006.01)
(52) U.S. Cl. ......... 251/308; 251/305; 123/336; 123/337
(58) Field of Classification Search ............... 251/304, 251/305, 306, 307, 308; 123/336, 337
See application file for complete search history.

(56) References Cited

U.S. PATENT DOCUMENTS

| | | | |
|---|---|---|---|
| 3,065,950 A | | 11/1962 | Goldberg |
| 3,070,345 A | * | 12/1962 | Knecht ............... 251/212 |
| 3,627,259 A | * | 12/1971 | Williams ............ 251/153 |
| 4,633,833 A | * | 1/1987 | Morris ................ 123/336 |
| 5,355,673 A | * | 10/1994 | Sterling et al. .......... 60/324 |
| 6,003,554 A | * | 12/1999 | Magdelyns et al. ...... 137/630.14 |
| 6,138,640 A | * | 10/2000 | Asanuma et al. ........ 123/337 |
| 6,494,434 B1 | | 12/2002 | Geiser |
| 6,981,519 B2 | * | 1/2006 | Heckt et al. ........... 137/599.18 |
| 7,464,692 B2 | * | 12/2008 | Isogai et al. ............ 123/337 |
| 7,712,639 B2 | * | 5/2010 | Schutz ................... 222/548 |

FOREIGN PATENT DOCUMENTS

| | | |
|---|---|---|
| DE | 2427995 | 1/1976 |
| DE | 3302159 | 1/1983 |
| DE | 3508318 | 3/1985 |
| DE | 3533937 | 9/1985 |
| DE | 19936457 | 2/2001 |
| JP | 48009425 | 2/1973 |

\* cited by examiner

*Primary Examiner* — John Fristoe, Jr.
(74) *Attorney, Agent, or Firm* — Notaro, Michalos & Zaccaria P.C.

(57) ABSTRACT

A valve arrangement has an annular housing with valve seat and a two-part valve plate that is rotatable about an axis. The seat is in the form of a disk including two adjacent openings with a web between and the axis is parallel to the web. The two parts of the valve plate are next to each other with their planes parallel and offset in a perpendicular direction. They are connected to each other through one of the openings by a connection piece extending through the one opening. In a closed position for the valve, the valve plate part are respectively positioned on opposite sides of the valve seat and cover and seal the respective openings due to a seal that is between the valve plate parts and the valve seat.

12 Claims, 3 Drawing Sheets

VALVE ARRANGEMENT

FIELD AND BACKGROUND OF THE INVENTION

The invention relates to a valve arrangement for pipe lines or containers.

Valves as shut-off members for liquid and gaseous media are required in many technical areas. Depending on the given requirements, different types of valves are utilized in manifold manner. Valves close off or open pipe lines or openings on containers. Valves close off or open, for example, lines between pumps, containers, measuring apparatus and other structural parts. They permit the intake or throughflow or the shutting down of liquids or gases or they can also serve as a sluice for solid bodies. The applications of valves are highly manifold and therewith also the requirements made of their construction. Important parts of a valve are the housing and a movable plate or a valve plate, possibly with a seal, which, depending on the position, enables or shuts down passage. The valve plate is moved from the outside, the atmosphere side, and is intended to close the passage opening depending on its position. In many cases intermediate positions can also be set, with the conductance being changed thereby and the valve in such a case can also be operated as a choke member with adjustable conductance. As a rule, in the closed position a high degree of tightness is demanded and in this case the valve must either be provided with a seal on the housing and/or on the valve plate margin. Here, as a rule, elastomer seals are utilized. Conventionally, one significant requirement made of the valve is that in the opened state as large a cross section is enabled for the passage of the medium. Consequently, a high conductance is to be attained in order to keep the flow losses low. This requires special valve constructions in order to keep the valve size within an acceptable range. A valve can per se be built and utilized with a larger cross section than the line cross sections it serves. For reasons of economy, however, the valve should not be too large, yet, it should nevertheless attain as good a conductance as possible.

A known valve arrangement which is intended to accommodate such demands, is the so-called butterfly valve. This valve type is per se structured simply. Within a tubular section or an annular housing part is disposed a disk-shaped valve plate with a shaft rotatably supported about a central axis. By rotating the shaft outside of the housing, on the atmosphere side, using a drive or manually about approximately 90°, the valve plate for the closing is rotated against the housing part or, for opening, is set into the direction of flow. For good sealing, the housing part is provided at the inner circumference with an elastomer material as a seal. The elastomer material is in many cases not disposed on the housing part but rather on the outer margin of the valve plate encompassing the latter. During the closing movement the seal in this case is squeezed under friction between the inner housing wall and the valve plate margin. Such a valve is described, for example, in DE 33 02 159 A1.

This valve type can be applied in many cases, in particular with liquid media which decrease the abrasion of the friction seal through the lubrication effect or also when lubricants can be utilized and a certain contamination thereby and by particles from the abrasion can be tolerated.

In application cases in which especially high purity is required, such a valve arrangement cannot be utilized. This is in particular the case in vacuum applications in which often highly pure processes are demanded, such as for example in many vacuum surface treatment processes, such as for example in thin-film technology. In such processes a seal would have to be run as a dry seal, since, for example, the use of any type of lubricant must be avoided as much as possible. Even if minimal quantities of lubricants are used, these would be stripped off after a few valve actuations. The seal would be strongly chafed through the friction and the generated particles would impermissibly contaminate the process. There is also the risk that the seal, for example an O-ring, becomes twisted or rolls or is even peeled off. The valve would thereby become non-usable after a short time. The driving forces would also be non-uniform and would change over time; they would, in particular, increase. The fundamental structure of the butterfly valve would per se be highly suitable for the application under vacuum conditions with respect to the good conductance properties attainable with this valve type. Attempts have therefore repeatedly been made to modify this valve type with respect to structure to the effect that the above listed problems can be decreased or avoided.

The known proposals for avoiding the frictional seal are to the effect that with an additional complex mechanism, the valve plate is first raised from the seat and only when the seal no longer touches it, is the plate rotated or, in reverse sequence, during the closing. Such complex valve arrangements have been described, for example, in DE 35 08 318 C1, DE 35 33 937 C1, U.S. Pat. Nos. 3,065,950 and 6,494,434.

SUMMARY OF THE INVENTION

The present invention consequently addresses the problem of eliminating the disadvantages of prior art. The present invention in particular addresses the problem of providing a valve arrangement of the butterfly type, in which no abrading and frictional movements occur on the seal and the start-up torque does not worsen even after relatively long standing and operating times. The valve arrangement should, moreover, be simple of structure, attain high reliability and be economically producible.

The problem is resolved in the generic valve arrangement according to the invention and other advantageous result from further embodiments of the invention.

According to the invention the valve arrangement for pipe lines or containers comprises an annular housing part which encompasses a line cross section with a parting plane and that within the housing part a valve plate is disposed, which plate is supported on the housing part on both sides rotatably and swivelably about a rotational axis transverse to the housing part between an open and a closed position, at least with one shaft part, and that on the housing part a valve seat is disposed, wherein between the valve seat and the valve plate a seal is provided and the valve plate in the closed position is in contact on the seal forming a sealing. The valve seat is formed in the shape of a disk and is disposed under sealing within the housing part transversely to this part and encompasses the parting plane and the valve seat disk includes two adjacent openings with an interspaced web, wherein the rotational axis is parallel to the web and the valve plate is formed as a two-part plate and these two valve plates are disposed next to one another with their planes parallel with respect to each other and offset in the perpendicular direction thereto, and the one valve plate is fixedly connected with the other valve plate using connection means extending via one of the openings, such that in the closed position the first valve plate is positioned on the one side of the valve seat disk and the second valve plate on the other side of the valve seat disk, wherein the two valve plates are associated across one of the two openings overlapping these and between the opening along their contours and the two valve plates is disposed on both sides of the valve seat disk one seal each, in contact on which are the associated valve plates in the closed position, forming a sealing.

In the closed state the valve separates the one side of the housing part from the other side whereby the desired blocking action of lines and/or container openings is made possible. This separating part forms in the closed state a parting plane between the regions to be separated. In the case of the above described simple plate valves, this is a single plane extending through the plate. In the valve arrangement according to the invention the parting plane is formed by the parallel offset planes of the two valve plates and the valve seat disk in the closed state. The parting plane is thus formed of three plane portions minimally parallel offset with respect to one another.

The rotational axis is located on one side of the valve seat disk and extends transversely to the housing part or to the direction of flow. It can be located centrally with respect to the cross section of the housing part or preferably minimally offset or asymmetrical. The valve plates are supported rotatably and swivelably about this rotational axis on both sides on the housing part. Small shaft parts can be provided for this purpose on both sides whose axes correspond with the rotational axis and which are disposed on both sides on the two valve plates, such that these can be swiveled onto the associated openings in the valve seat disk for closing the valve with the formation of a sealing. Instead of short shaft parts, a continuous shaft piece can also be utilized. At least on one side of the housing part the shaft part or the shaft is carried to the outside through this part via a shaft seal in order to make it feasible to be driven on the atmosphere side. This can take place in known manner manually or with a valve actuator. The valve is smooth-running and operatable with steady drive torques, even over relatively long operating time. The valve can thus be operated highly precisely and reproducibly and accurate intermediate positions can be set or are controllable, whereby the conductance can be set precisely or it can also be controlled such that it is continuously varied.

This valve arrangement is suitable for small valves as well as also for large valves, in particular in the range of nominal widths from 2.0 cm to 1000 cm.

It is also feasible to predetermine the closing forces or the opening forces in suitable magnitude depending on the application and the medium to be conducted, thereby that the dimensions of the two openings on the valve seat disk and the associated valve plates are predetermined of different magnitudes such that the movement during the opening, or in particular during the closing, are supported. This means, for example, the secure sealing in the closed position and thus lower necessary driving forces. This can lead to smaller execution of the entire valve arrangement and to lower production costs. This behavior of the valve arrangement introduced here permits an especially advantageous deployment in the field of vacuum technique where there are especially high requirements, for example with respect to purity, good conductance values, reproducible behavior, long service life, simple handling and maintenance.

The various features of novelty which characterize the invention are pointed out with particularity in the claims annexed to and forming a part of this disclosure and are entirely bases of the priority application which is Swiss patent application CH-01954/08 filed Dec. 12, 2009. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following the invention will be described schematically and by example in conjunction with figures.

In the drawings.

DESCRIPTION OF THE PREFERRED EMBODIMENTS

Figure 1:
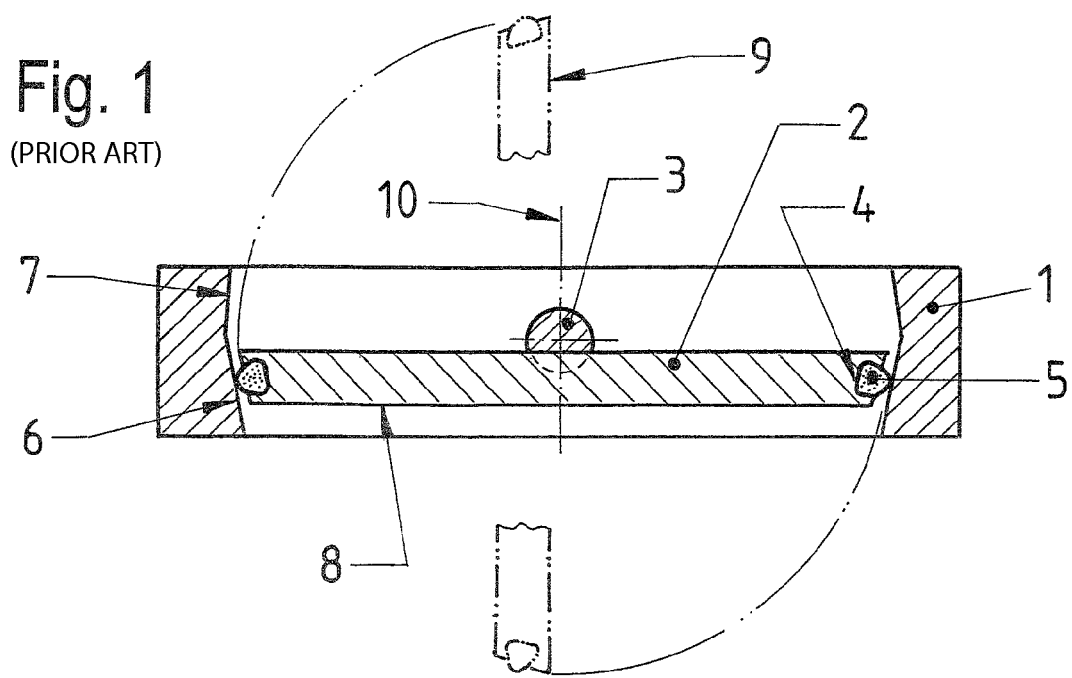
FIG. 1 is a schematic cross sectional view of a single-part plate valve of type butterfly according to prior art.

FIG. 1 shows a plate valve or also flap valve of type "butterfly" in cross section, such as has been known for a long time according to prior art. The butterfly valve is comprised of a housing part 1 with a duct opening and a single-part valve plate 2, disposed therein transversely to the opening, which plate is connected, such as for example screwed, centrally over its face with a shaft 3. The shaft 3 is disposed transversely to the housing part 1 and rotatably supported on both sides on its walls. In the valve plate 2 is sunk at the end side an encircling groove 4, into which an O-ring 5 is placed as a seal. The housing part 1 includes on the inside on both sides to the axis of the duct opening or to the direction of flow one cone 6, 7 each, which encompass the inner circumference of the housing part 1 with the duct opening and whose faces with the same and greater diameter abut one another in the form of a V. In the closed position 8 of the valve the valve plate 2 is positioned transversely to the housing part 1 in the center region of the faces of the cones 6, 7, where the valve plate is in contact on them over the entire circumference forming a sealing. For this purpose, on the circumference of the valve plate 2 is disposed an O-ring seal 5 in an encircling groove 4 which, in the closed position 8, is pressed between the inner circumference of the housing part 1, or the faces of the cones 6, 7 in contact on one another, and the outer circumference of the valve plate 2, and thus is in contact on the faces forming a sealing. The faces of the two cones 6, 7 form a type of run-in faces for the seal 5 and permit its being pressed into the end position, as is shown in FIG. 1.

In the open position 9 the face of the valve plate is rotated into the direction of flow or into the axial direction of the duct opening. For opening and closing the valve, thus a maximal rotation or tilting of the valve plate about 90° is feasible.

This valve arrangement with the cone faces 6, 7 is formed such that in the rotation of the valve plate about 90° from the open position 9, between the valve plate 2 and the inner wall of the housing part 1 and/or the lines disposed thereon there is sufficient play and that in the positioning toward the 0° position, thus in particular in the closed end position 8, this play over the run-in faces of the cones is decreased until the seal 5 is compressed and consequently here in this end position (closed position 8) a sealing is formed. The 90° rotation of the valve plate can be performed manually, electrically, pneumatically, magnetically or hydraulically via the shaft 3 from the outside. At the drive side, the end stop 0° and 90° is defined, wherein the 0° end stop, thus the closed position 8, must be fine adjustable.

Since the O-ring 5 must be abrading sideways on the cone 6 for the compressing here for the sealing function, the wear, in particular in vacuum application, is enormous. There is also the risk that the O-ring 5 starts to roll in its groove and therewith becomes twisted and it is peeled off (appr. section 90° to shaft 3). After a relatively long standstill in the closed position 8, a grease film possibly applied for lubrication on the O-ring is also gone and during the first actuation of the rotational movement the drive torque is extremely great in this case. In vacuum operation the O-ring 5 should not be lubricated or only very minimally so that the lubricant, such as a grease, does not contaminate the process. The service life of the O-ring 5 is a function of the type of lubrication and of the contamination permitted thereby of the particular vacuum process involved. In certain very pure vacuum processes lubricants are generally not permitted.

The above listed problems are resolved according to the present invention by implementing a valve arrangement according to the examples, such as are depicted in the FIGS. 2 to 5 and which are in particular suitable for vacuum applications.

Figure 2:
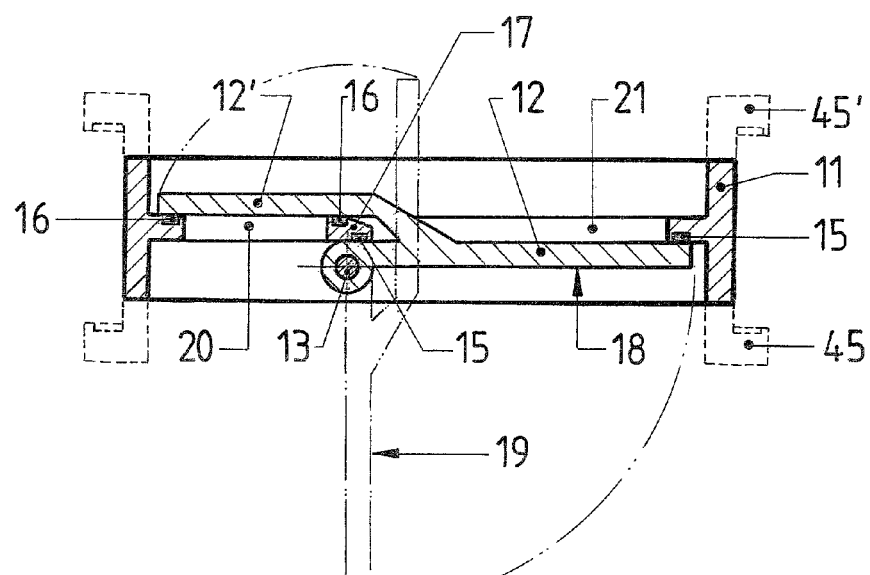
FIG. 2 is a schematic cross sectional view of a two-part valve arrangement with two valve plates according to the present invention.

FIG. 2 depicts schematically and in cross section a valve arrangement according to the invention. The closed position 18 is drawn in solid line thickness, wherein in the same figure the open position 19 with valve plates 12, 12' rotated by 90° is shown in dashed lines.

The valve arrangement for pipe lines or containers comprises an annular housing part 11, which encompasses a line cross section with a parting plane and that within the housing part 11 a valve plate 12, 12' is disposed which is supported on both sides rotatably and swivelably between an open and closed position with at least a shaft part 13, 13' on housing part 11, and that on the housing part 11 a valve seat 17 is disposed, wherein between the valve seat 17 and the valve plate a seal 15, 16 is provided and the valve plate 12, 12' in the closed position is in contact on seal 15, 16 forming a sealing. According to the invention the valve seat 17 is developed in plate-shape and is disposed within the housing part 11 transversely to this part forming a seal and encompasses the parting plane, and the valve seat disk 17 includes two adjacent openings 20, 21 with a web implemented in between, wherein the rotational axis 10 is disposed parallel to the web and the valve plate 12, 12' is formed in two parts and these two valve plates 12, 12' are disposed next to one another with their planes parallel with respect to one another and offset in the perpendicular direction thereto, and the one valve plate 12 is fixedly connected with the other valve plate 12' via one of the openings 20, 21 using connection means 14 extending through this opening, such that in the closed position the first valve plate 12 is positioned on the one side of the valve seat disk 17 and the second valve plate 12' on the other side of the valve seat disk 17, wherein the two valve plates 12, 12' are associated via one of the two openings 20, 21 each overlapping these openings and between the openings 20, 21 along their contours and the two valve plates 12, 12' on both sides of the valve seat disk 17 one seal 15, 16 each is disposed on which the associated valve plates 12, 12' are in contact in the closed position forming a sealing.

The housing part 11, 11' encompasses an opening with a cross section or the line cross section and is preferably formed annularly like a type of tube section. This housing part receives the parts for the implementation of a valve and forms a valve arrangement with a parting region or a parting plane. This valve arrangement can in known manner be connected on one or both sides via connection means 45 on the housing part 11, 11' with a pipe line and/or a container opening. The connection means 45 can be implemented variously, however, they are preferably developed as flanges 45, 45'. The valve arrangement is thereby simply insertable as a structural part. However, it can also be integrated fixedly in a pipe line or on a container opening.

The parting plane is formed within the housing part 11, 11' transversely thereto and about this plane are implemented the shut-off members of the valve. The shut-off members include a valve seat disk 17 with two openings 20, 21 which, located on the inner circumference and transversely to the housing part 11, 11', is connected forming a sealing, as well as two valve plates 12, 12' swivelably jointly and simultaneously about a rotational axis 10, with which the two openings 20, 21 can be opened or closed forming a sealing. The openings can thereby be closed in the direction of flow of the medium or in the pipe line direction or they can be released, whereby a valve is implemented as a shut-off member.

Figure 3:
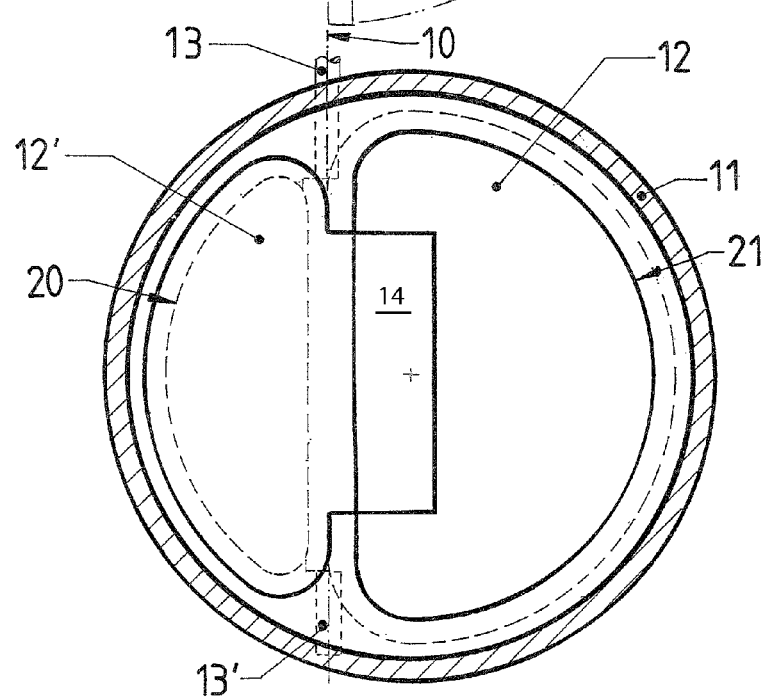
FIG. 3 is a schematic view from one side of the flow direction onto the valve arrangement with top view onto the valve plates in the closed position.
Figure 4:
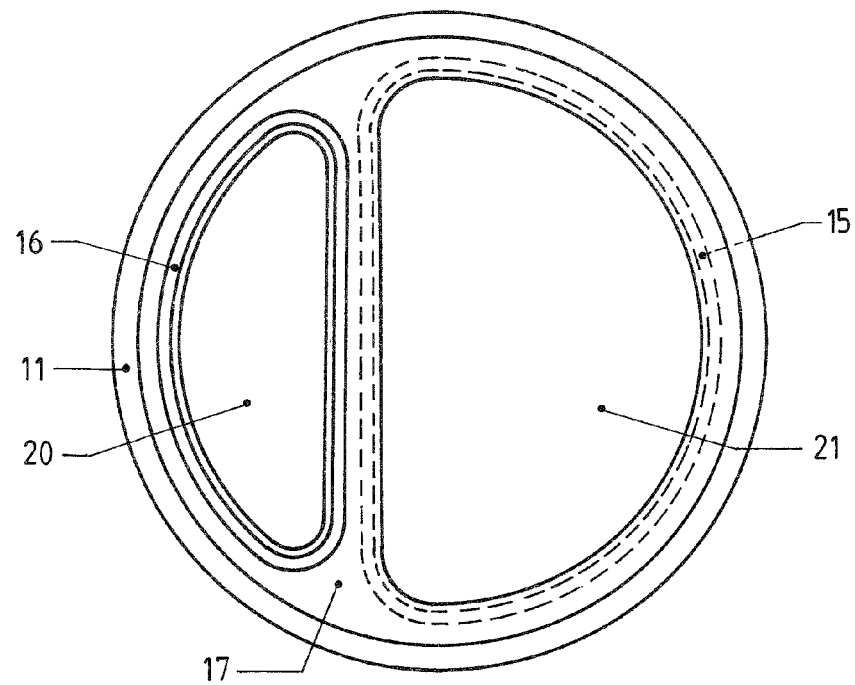
FIG. 4 is a schematic view similar to FIG. 3 with top view onto the valve seat disk with the two openings and the position of the seals on the valve seat disk, without the valve plates for greater clarity.

The cross sections of the two openings 20, 21 can be of like size or be different at a ratio. In FIGS. 2 to 4 are depicted differently sized openings 20, 21 by example, for example at a ratio of 1 to 2. With differently sized openings 20, 21 the closing or opening forces, depending on the flow direction, for closing or opening, can, as desired, act in support of or as a hindrance, depending on the insertion position of the arrangement and the forces can be predetermined as a function of the opening ratio.

Since the two openings 20, 21 are cut out in the same valve seat disk 17, they lie in the same plane and between them is formed a web 17' on the valve seat disk. The rotational axis 10 with a shaft 13 or shaft parts 13' is disposed on one side of this web 17' parallel to the valve seat disk 17 and parallel to web 17'. In addition, the rotational axis 10 does not intersect either of the openings. Openings 20, 21 are preferably positioned symmetrical to the rotational axis 10. The two valve plates 12, 12' are fixedly connected with one another via connection means 14 and their planes are offset at a spacing and parallel to one another. This spacing corresponds to the thickness of the valve seat disk 17 with the desired compression of the seal 15, 16, such that these plates can be swiveled jointly and are held fixedly in the same position with respect to one another and in the closed position 18 cover the two openings 20, 21. The connection means 14 extends through one of the two openings 20, 21, preferably through the larger one, if differently sized openings are utilized. The rotational axis 10 with shaft 13 or shaft parts 13, 13' is located on one side of the valve seat disk 17 at a minimal spacing, and is fixed on the valve plate 12, on the same side, as is depicted in FIG. 2. In the closed valve position 18, both valve plates 12, 12' are in contact on the valve seat disk 17 and cover the associated openings 20, 21 forming a sealing. In the margin region of the coverage is disposed one seal 15, 16 each encircling the openings 20, 21. The seals 15, 16 can be disposed on the valve seat disk 17 and/or on the valve plates 12, 12' and are with advantage sunk into a groove as is shown in FIGS. 2 to 5.

Openings 20, 21 are advantageously formed with as large a cross section as possible in order to attain good conductance values in the open valve position 19. In this case the openings 20, 21 follow as much as possible the inner annular contour of the inner wall of housing part 11 and in the region located between them a straight-like web 17' is formed and the rotational axis 10 is parallel to this web 17'. The remaining contour of the valve seat disk 17 serves as a stop for the two valve plates 12, 12' and, in the overlap region with the valve plates following the contour of the two openings 20, 21, accepts the grooves located in between for receiving the seals 15, 16. In FIG. 2 are shown as the preferred example sealing grooves, which are disposed on the valve seat disk 17. In web 17' in the example of FIG. 2, in the case of the seal on the valve seat disk 17, one seal 15, 16 each is disposed on the upper and lower side. Seal 15 and seal 16 are each closed in the form of loops or annularly, preferably in the form of a D, and geometrically separate from one another since they are at different levels. However, these can also be disposed on the valve plates or on both.

For better mountability, the two-part valve plate 12, 12' can be comprised of several parts and the two valve plates can be fixedly or detachably connected with a connection element 14. The valve plates 12, 12' are rotatably supported with the shaft 13 or shaft pieces 13, 13' on both sides on the wall of housing part 11, wherein preferably only one of the shaft ends 13, 13' has a sealed guidethrough with a shaft seal 38 toward the outside through the housing part 11. The other shaft end 13' in this case does not have a guidethrough to the outside and includes only one shaft bearing on housing part 11. The 90° rotation from position 0° closed 18 to position 90° open 19 of the two-part valve plate 12, 12' can be carried out from the outside, for example, manually, electrically, pneumatically, magnetically or hydraulically via the shaft 13 carried to the outside. With the externally disposed rotational drive 39 the end stop 0° and 90° is defined, wherein the 0° end stop, thus the closed position 18, must be finely adjustable.

FIG. 3 shows a top view of a valve arrangement in the closed position 18 onto the valve seat disk 17 and the two valve plates 12, 12' and a cross section of the housing part 11, or a top view from the one side of the parting plane in the direction of flow, for greater clarity. A second valve plate 12', here implemented smaller than the first valve plate 12, covers the subjacent second opening 20 (dashed line) above the valve seat disk 17 and the first valve plate 12 (dashed line) abuts the valve seat disk 17 from below, covering the first opening 21. The second valve plate 12' is fixedly connected with the first valve plate 12 via the connection means 14 and their faces are held parallel and at a spacing from one another such that both valve plates 12, 12' with respect to their planes are parallel to one another and to the valve seat disk in the closed position 18 forming a sealing. The connection means 14 extends herein through one of the openings 20, 21, preferably through the larger opening 21, wherein the shaft 13, 13', or the shaft parts is fixedly disposed with its rotational axis 10 (dashed line) beneath web 17' parallel thereto on the subjacent first valve plate 12.

FIG. 4 depicts the same view as FIG. 3 without the valve plates 12, 12' with the rotational axis 10, for clarifying the disposition of the grooves with the seals 15, 16, here as an example for the disposition of the seals on the valve seat disk 17. The second groove with seal 16 encompasses the second opening 20 is here disposed above the valve seat disk 17 (visible) and the first groove with seal 15 encompasses the first opening 21 and is here disposed on the backside of the valve seat disk 17 (concealed-dashed line).

The ratio of the cross sections of both openings 20, 21 can be selected such, for example for operation in a vacuum and under atmospheric pressure, that the greater valve plate 12 is supportive in pressing on and sealing in that the atmosphere is in contact on the face of the larger valve plate 12, such as for example at a ratio of the openings 21, 20 of 2:1. If the web 17', for example, is disposed precisely in the center of the housing 11 and the two openings 20, 21 are of equal size, the forces during the sealing are of equal magnitude and in balance.

In the introduced valve arrangement according to the invention, seals, such as for example O-rings, 15, 16 are pressed in the sealing process exclusively in the normal direction toward the counterpiece. Abrading or frictional contacts are consequently completely avoided. The O-ring is thereby not worn down and no undesirable particles are generated which would contaminate the medium, in particular the vacuum, with the associated process and the seal can also no longer become twisted or peel off, whereby a significantly longer service life is attained. The seal or the sealing zone also no longer needs to be thoroughly lubricated or it can even be operated as a dry seal without lubricant. The start-up torque for the shaft 13 does not increase even after relatively long standstill of the valve. The rotary drive 38 requires a lower torque since the seals no longer generate a large start-up torque. The rotary drive can thus also be dimensioned smaller and weaker and is thus also more cost-effective. Due to the constant, reproducible behavior of the actuation forces, the valve can be operated highly precisely and intermediate positions, thus predeterminable conductance values, can also be set and also be regulated reproducibly. Especially in vacuum processes with high requirements, such as in plasma processes, this is especially important, for example for the regulation of gas flows and/or pump performances.

Figure 5:
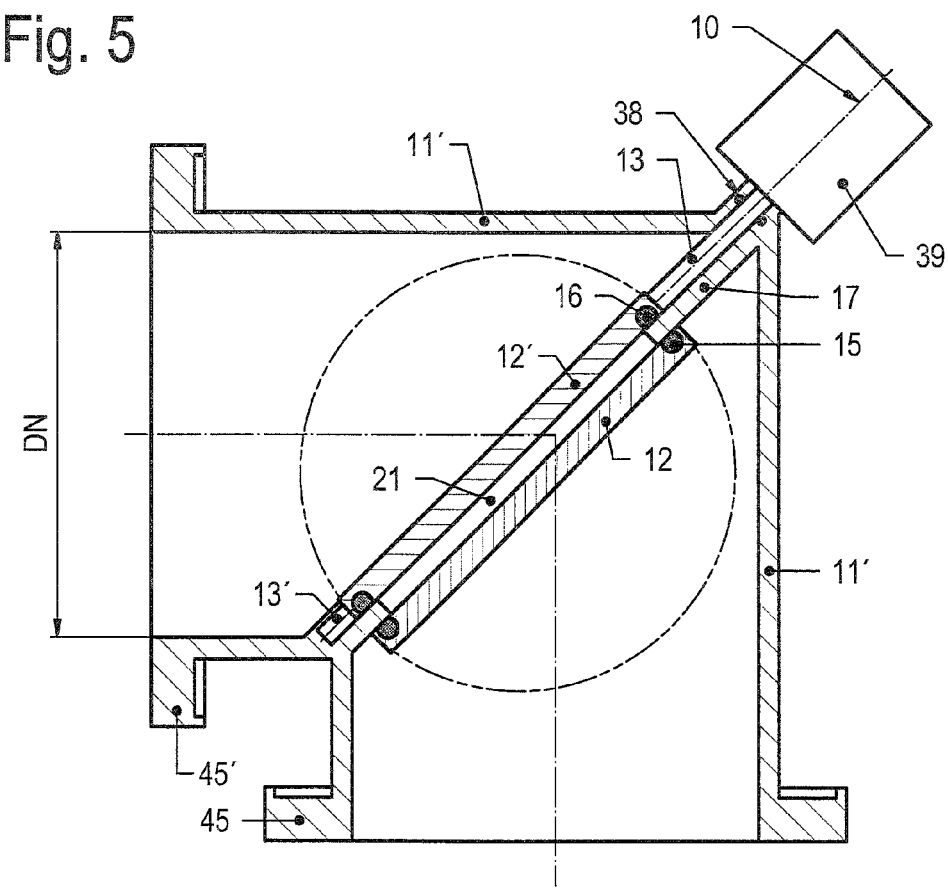
FIG. 5 is a schematic cross sectional view of a valve arrangement according to the present invention installed in a housing part for an angle valve.

This valve arrangement is also especially well suited for the application in angle valves, as is depicted schematically and by example in FIG. 5 in cross section. In particular for large angle valves, for example for nominal widths DN of 250 to 630 ISO-K the introduced valve arrangement can be applied especially advantageously. Through the longitudinal setting of the valve plate with respect to the flow, a high conductance of the valve can be attained. For example, a simple pneumatic rotary drive 39 with shaft 13 carried out to the outside via a rotary vacuum throughguide 38 is also feasible. Since the diagonal in this valve arrangement is greater by $\sqrt{2}$ with respect to the nominal diameter of the line cross section, large openings 20, 21 on the valve seat disk 17 can be attained, whereby greater conductance values can be achieved.

While specific embodiments of the invention have been shown and described in detail to illustrate the application of the principles of the invention, it will be understood that the invention may be embodied otherwise without departing from such principles.

What is claimed is:

1. A valve arrangement for pipe lines or containers, comprising: an annular housing part (11, 11') encompassing a line cross section having a parting plane; a valve plate (12, 12') having at least one shaft part (13, 13') supported on the housing part (11) on both sides of the valve plate and being rotatable about a rotational axis (10) that is transverse to the housing part between an open and a closed position; a valve seat (17) on the housing part (11, 11'); a seal (15, 16) between the valve seat (17) and the valve plate (12, 12') for forming a sealing between the valve seat and the valve plate in the closed position; the valve seat (17) comprising a disk disposed within and transversely across the housing part in the parting plane, the valve seat disk (17) including two adjacent openings (20, 21) with a web between the openings, the rotational axis (10) being disposed parallel to the web; the valve plate (12, 12') comprising a two-part plate having first and second valve plate parts (12, 12') disposed next to one another, the valve plate parts lying in parallel planes with respect to one another that are offset from each other in a direction perpendicularly to the parallel planes, the first valve plate part (12) being fixedly connected to the second valve plate part (12') by connection means (14) for connecting the valve plate parts to each other through one of the openings (20, 21) such that in the closed position the first valve plate part (12) is positioned on one side of the valve seat disk (17) to cover one of the openings (20) and the second valve plate (12') is positioned on an opposite side of the valve seat disk (17) to cover the other opening (21); the seal comprising two seals (15, 16), one seal extending around the one opening (20) and the other seal extending around the other opening (21), the seals being between the valve seat disk (17) and the respective valve plate parts (12, 12') on both sides of the valve seat disk (17) for sealing the two openings in the closed position.

2. A valve arrangement as claimed in claim 1, wherein at least one of the seals (15, 16) is disposed on the valve plates (12, 12').

3. A valve arrangement as claimed in claim 1, wherein at least one of the seals (15, 16) is disposed on the opposite sides of the valve seat disk (17).

4. A valve arrangement as claimed in claim 3, wherein both of the seals (15, 16) are disposed on the valve seat disk (17).

5. A valve arrangement as claimed in claim 1, including a groove in at least one of the valve seat disk (17), the first valve plates part (12), and the second valve plate part (12'), for receiving at least one of the seals (15, 16), the groove following a contour of the respective opening (20, 21), and the respective valve plate (12, 12') in the closed position is in contact on the respective seal (15, 16) for sealing the respective opening.

6. A valve arrangement as claimed in claim 1, wherein the seals (15, 16) are elastomer seals.

7. A valve arrangement as claimed in claim 1, wherein the seals (15, 16) are elastomer O-ring seals.

8. A valve arrangement as claimed in claim 1, wherein one of the two openings (2, 21) has a greater cross section than the other opening.

9. A valve arrangement as claimed in claim 1, wherein an opening cross section of both openings (20, 21) is at least 45% of the line cross section.

10. A valve arrangement as claimed in claim 1, wherein an opening cross section of both openings (20, 21) is at least 60% of the line cross section.

11. A valve arrangement as claimed in claim 1, wherein the openings (20, 21) each have a shape that in an outer region follows a round contour of the housing part (11) and in a region between the openings, forms a straight-line along the web.

12. A valve arrangement as claimed in claim 1, wherein the valve arrangement is a vacuum valve.

* * * * *